United States Patent [19]
Tomiyama et al.

[11] Patent Number: 5,684,645
[45] Date of Patent: Nov. 4, 1997

[54] LENS MOVING APPARATUS PREVENTING RESONANCE WITHOUT USING YOKE BRIDGE AND COUNTERWEIGHT

[75] Inventors: Takamichi Tomiyama; Koji Mitsumori; Keiichi Shibata; Hideo Ohkuma, all of Chiba, Japan

[73] Assignee: Sony Corporation, Japan

[21] Appl. No.: 569,296

[22] Filed: Dec. 8, 1995

[30] Foreign Application Priority Data

Dec. 13, 1994 [JP] Japan .................. 6-332494

[51] Int. Cl.⁶ ............................................ G02B 7/02
[52] U.S. Cl. ................................. 359/824; 359/814
[58] Field of Search ........................... 359/824, 823, 359/822, 814, 813; 369/44.15, 44.14, 44.16

[56] References Cited

U.S. PATENT DOCUMENTS

| | | | |
|---|---|---|---|
| 4,669,823 | 6/1987 | Iguma | 380/255 |
| 4,878,214 | 10/1989 | Hinotani | 369/256 |
| 5,046,820 | 9/1991 | Saekusa et al. | 359/814 |
| 5,103,438 | 4/1992 | Masunaga | 364/44.22 |
| 5,136,565 | 8/1992 | Ooyama et al. | 369/44.14 |
| 5,208,703 | 5/1993 | Ikegame | 359/813 |
| 5,373,496 | 12/1994 | Tomita | 369/219 |
| 5,416,756 | 5/1995 | Takeshita | 369/32 |
| 5,535,059 | 7/1996 | Mitsumori | 359/813 |
| 5,555,228 | 9/1996 | Izuka | 369/44.15 |

FOREIGN PATENT DOCUMENTS

| | | |
|---|---|---|
| 0 376 531 A1 | 7/1990 | European Pat. Off. . |
| 0 419 097 A2 | 3/1991 | European Pat. Off. . |
| 0454854 A1 | 11/1991 | European Pat. Off. . |
| 0660312 A1 | 6/1995 | European Pat. Off. . |

Primary Examiner—Georgia Y. Epps
Assistant Examiner—Ricky Mack
Attorney, Agent, or Firm—Ronald P. Kananen

[57] ABSTRACT

A lens moving apparatus of the present invention is used in an optical pickup of, for example, an optical recording/reproducing system. The apparatus includes a moving assembly holding an objective lens and provided with a coil bobbin, elastic supporting devices which support the moving assembly along the focusing dimension and the tracking dimension, focusing coils and tracking coils wound on the coil bobbin, and a magnetic circuit formed by a yoke and a magnet. The center of gravity of the moving assembly is positioned so that the product of the distance from an effective section of the focusing coil to the center of gravity of the moving assembly and the force produced at the effective section is about equal to the product of the distance from a noneffective section of the focusing coil to the center of gravity of the moving assembly and the force produced at the noneffective section.

11 Claims, 4 Drawing Sheets

LENS MOVING APPARATUS PREVENTING RESONANCE WITHOUT USING YOKE BRIDGE AND COUNTERWEIGHT

BACKGROUND OF THE INVENTION

1. Field of the Invention

The present invention relates to an optical pickup bi-axial actuator utilized for recording and reproducing a signal with respect to an optical information recording medium such as an optical disc or a magneto-optic disc.

2. Description of the Related Art

Hitherto, reproduction and recording of an information signal with respect to an information recording medium such as an optical disc, e.g. so-called compact disc (CD) and magneto-optic disc, have been performed using an optical pickup. The optical pickup includes a semiconductor laser as a light source, an objective lens, an optical system, and a light detector.

In the optical pickup, the optical beam, emitted from the semiconductor laser, is focused onto an optical disc recording surface by the objective lens via an optical system. Then, the light beam reflected by the optical disc is separated with a light beam emitted from the semiconductor laser by the optical system and then introduced into the light detector.

The position along the optical axis dimension of the objective lens is adjusted by an actuator described below so that the light beam emitted from the semiconductor laser is focused onto the optical disc recording surface in response to the displacement of the optical disc along the dimension perpendicular to the dimension of the surface of the optical disc, the displacement being caused by warping of the optical disc or the like. At the same time, the position along the dimension perpendicular to the optical axis of the objective lens is adjusted by an actuator described below so that the position of the spot of the light beam emitted from the semiconductor laser on the optical disc moves along the track formed on the eccentricity of the optical disc or on the optical disc.

Adjustments of the position of focus of the light beam emitted from the semiconductor laser and the position of the spot on the optical disc recording surface are performed by adjusting the objective lens at a position along the optical axis dimension of the objective lens as well as the position along the dimension perpendicular to the optical axis of the objective lens. The objective lens position is adjusted using an electromagnetic drive type actuator.

This actuator is called an objective lens actuator or a bi-axial actuator. A form of the actuator comprises a bobbin having mounted thereto an objective lens, a plurality of elastic supporting members, and a drive section which generates a driving force. The bobbin is supported by the plurality of elastic supporting members with respect to a fixing section in such a manner that allows it to adjust the position of the objective lens along the optical axis dimension, that is the focus position, and the position along the dimension perpendicular to the optical axis of the objective lens, that is the tracking position. A bi-axial actuator will be described below, with reference to FIG. 5.

Such a bi-axial actuator is, for example, constructed as shown in FIG. 5.

Referring to the figure, a bi-axial actuator 1 comprises a lens holder 2 having an objective lens 2a mounted at its front end, and a coil bobbin 3 mounted to the lens holder 2 by bonding or the like.

The aforementioned lens holder 2 is supported by two pairs of elastic supporting members 5, one end of each pair being fixed to both sides of the lens holder 2 and the other end of each pair being fixed to the fixing section 4, so that the holder 2 can move vertically along two dimensions, that is along the tracking dimension indicated by Trk and the focusing dimension denoted by Fcs, with respect to the fixing section 4.

The aforementioned coil bobbin 3 is constructed as illustrated in FIG. 6.

The coil bobbin 3 has an opening 3a which extends along the focusing dimension which is denoted by Fcs right through the bobbin, focusing coils 3b wound in such a manner as to surround the opening 3a, and tracking coils 3c provided at two places at the front side of the coil bobbin 3. Each of the ends of the focusing coils 3b and the tracking coils 3c are connected to a connecting pin (not shown) which is provided at the back side of the coil bobbin 3.

When current flows through the focusing coils 3b and the tracking coils 3c via the aforementioned connecting pin, a magnetic flux is produced in the coils 3b and the coils 3c. The magnetic flux interacts with the magnetic flux in a yoke 6 integrally mounted to the fixing section 4 and that in a permanent magnet 7 attached to the yoke 6. In this case, the coils 3b and 3c are such as to cause the magnetic flux developed in a coil portion inside the effective magnetic field between an inner yoke member 6a and a facing yoke member 6b of the yoke 6 to generate a driving force along the focusing dimension or the tracking dimension.

More specifically, force F1 which moves the lens holder 3 along the focusing dimension Fcs is produced by current that flows through an effective section 3b-1 of the focusing coil 3b in accordance with Fleming's left-hand rule. The effective section 3b-1 exists between the inner yoke member 6a and the facing yoke member 6b and takes part in controlling the focusing operation. On the other hand, force F2 (not shown) which moves the lens holder 3 along the tracking dimension Trk is developed by current flowing through the tracking coils 3c which extend vertically at the inner side, in accordance with Fleming's left-hand rule.

The inner yoke member 6a and the facing yoke member 6b have their upper ends linked by a yoke bridge 6c. The yoke bridge 6c, which is made of magnetic material, closes the magnetic path formed by the inner yoke member 6a and the facing yoke member 6b. This arrangement causes the magnetic flux, passing through a non-effective section 3b-2, which does not take part in controlling the focusing operation and faces the aforementioned effective section 3b-1 of the focusing coil 3c, to be almost completely blocked by the yoke bridge 6c. As a result, a force or opposing thrust F3 generated by the current which flows through the non-effective section 3b-2 becomes so small as to be negligible.

The aforementioned elastic supporting members 5 are made of elastic material and are fixed between the lens holder 2 and the fixing section 4 such that they are parallel therewith.

Here, the elastic supporting members 5 have flexing displacement sections 9 provided at the end portions 5a thereof, adjacent to the fixing section 4.

In the bi-axial actuator 1 with such a construction, the magnetic flux, produced in each coil by externally supplied drive voltage to each coil, interacts with the magnetic flux of the yoke 6 and that of the permanent magnet 7 to move the coil bobbin 3 along the tracking dimension Trk and the focusing dimension Fcs. In this way, the objective lens 2a mounted onto the lens holder 2 is moved along the focusing dimension and the tracking dimension as required.

In the bi-axial actuator 1 with such a construction, a so-called moving section assembly, comprising the lens holder 2, the objective lens 2a, and the coil bobbin 3 having wound thereon the coils 3b and 3c, is constructed such that its center of gravity G, as shown in FIG. 6, roughly coincides with where the aforementioned driving forces F1 and F2 are applied, without any phase lag with regard to the movement caused by the aforementioned driving forces F1 and F2 during focusing and tracking operations. When the center of gravity roughly coincides with where the driving forces are applied, the resonance mode of the elastic supporting member 5 is suppressed.

As shown in FIG. 6, however, in the bi-axial actuator 1 having such a construction, a balance weight 8 is added to the rearmost end of the lens holder 2 in order to make the center of gravity G of the moving section assembly having a heavy objective lens 2a on its left side roughly coincide with the point of application of the driving forces F1 and F2 due to the focusing coils 3b and the tracking coils 3c.

In addition, yoke bridge 6c is provided to link the upper ends of the inner yoke member 6a and the facing yoke member 6b so that the magnetic flux produced by the permanent magnet 7 and that due to the yoke 6 do not pass through the noneffective section 3b-2 opposite the effective section of the focusing coil 3b.

Therefore, more parts must be used, which results in higher parts cost and assembly cost. In addition, the balance weight 8 added to the moving section assembly adds to the weight of the moving section assembly and thus makes the assembly and the objective lens less responsive to driving along the focusing dimension and the tracking dimension.

SUMMARY OF THE INVENTION

According to the present invention, there is provided a lens moving apparatus including a moving assembly which holds an objective lens and has a coil bobbin, elastic supporting means for supporting the moving assembly along the focusing dimension and the tracking dimension, focusing coils and tracking coils which are wound on the coil bobbin, and a magnetic circuit formed by a yoke and a magnet.

The center of gravity of the moving assembly is positioned such that the product of a distance from the effective section of the focusing coil to the center of gravity of the moving assembly and the force produced at the effective section is about equal to the product of a distance from the noneffective section of the focusing coil to the center of gravity of the moving assembly and the force produced at the noneffective section.

According to the present invention, a force F' opposite in direction to a force F produced at the effective section of the focusing coil is produced at the noneffective section of the focusing coil utilizing leakage magnetic flux from the magnetic circuit. The force F is balanced by the opposing force F' with respect to the center of gravity of the moving assembly, thereby making it possible to reduce the weight of the moving assembly as well as to suppress resonance produced during focusing.

With such a construction, when the lens holder holding the objective lens is supported by the elastic supporting members, passing current through the focusing coils or the tracking coils causes the lens holder to move along the focusing dimension or the tracking dimension against the holding power of the elastic supporting member, so as to effect focusing or tracking of the objective lens.

The focusing coil develops a thrust and an opposing thrust along the focusing dimension at the effective section disposed between the inner yoke member and the facing yoke member and at the noneffective section opposite the effective section, respectively. The product of the opposing thrust and the distance from the noneffective section to the center of gravity of the moving section assembly is equal to the product of the aforementioned thrust and the distance from the effective section to the center of gravity G of the moving section assembly. Therefore, the opposing thrust, produced at the noneffective section opposite the effective section of the focusing coil, suppresses resonance mode of the elastic supporting member caused by the movement of the moving section assembly during focusing.

When a balance weight is not fixed to the rearmost end of the lens holder to position the center of gravity G forwardly of the tracking coils, the moving section assembly becomes lighter in weight.

When the inner yoke member and the facing yoke member each have an open upper end in order to increase the opposing thrust produced at the noneffective section of the focusing coil, opposite the effective section, it becomes unnecessary to employ a yoke bridge that links the upper ends of the inner yoke member and the facing yoke member to form a magnetic path.

DESCRIPTION OF A PREFERRED EMBODIMENT

A description will hereunder be given in detail of a preferred embodiment of the present invention, with reference to FIGS. 1 to 4.

It is to be noted that although various preferred technical limitations have been described, since the embodiment to be described below is a preferred embodiment of the present invention, the scope of the present invention is not limited to the forms thereof, unless specific mention is made of limitations of the present invention in the following description.

Figure 1:
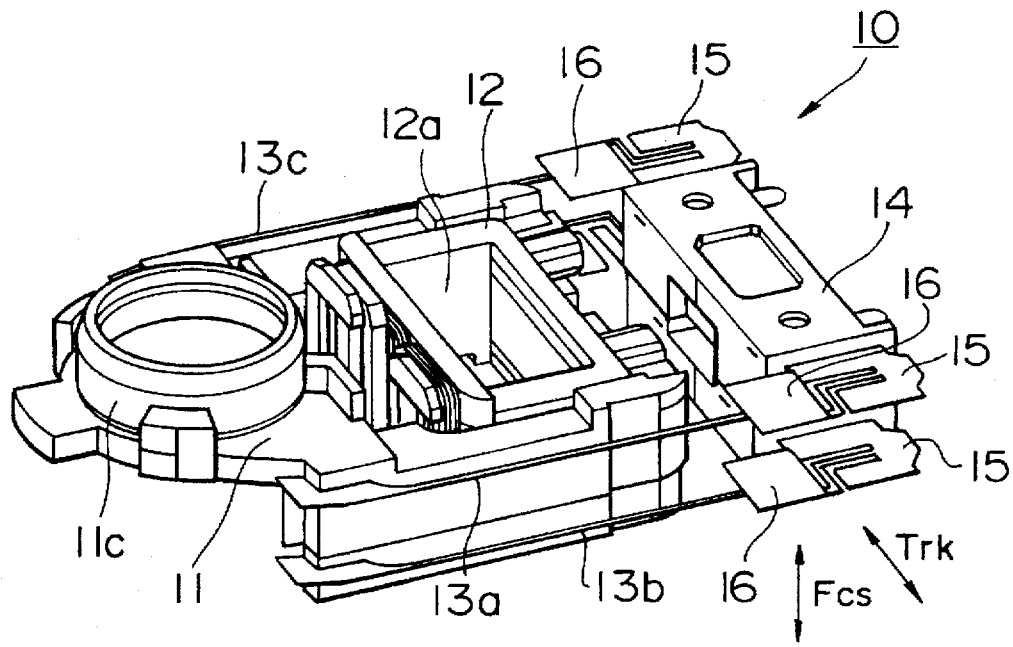
FIG. 1.is a schematic perspective view of an overall construction of an optical pickup bi-axial actuator of an embodiment of the present invention, as seen from the front.
Figure 2:
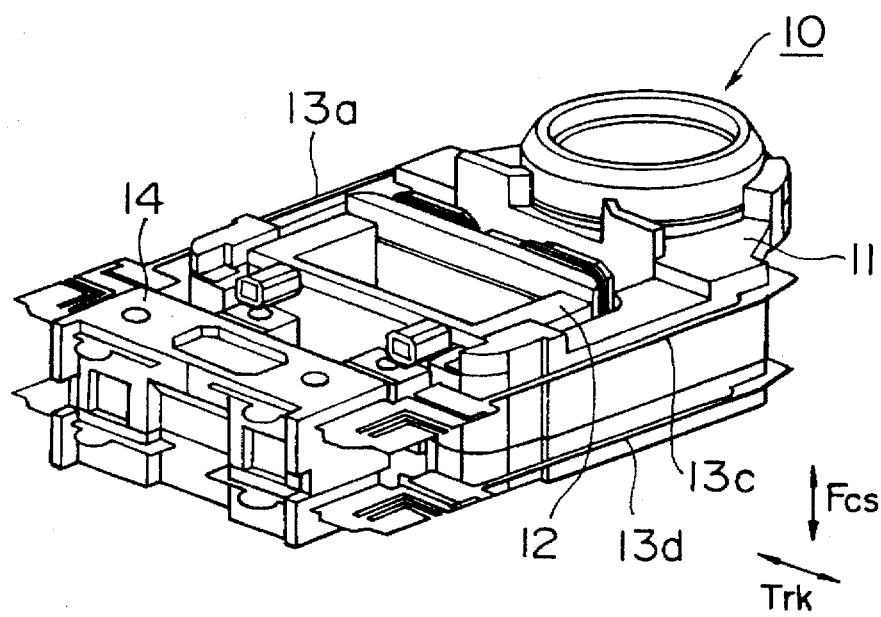
FIG. 2 is a schematic perspective view of the bi-axial actuator of FIG. 1, as seen from the back.
Figure 3:
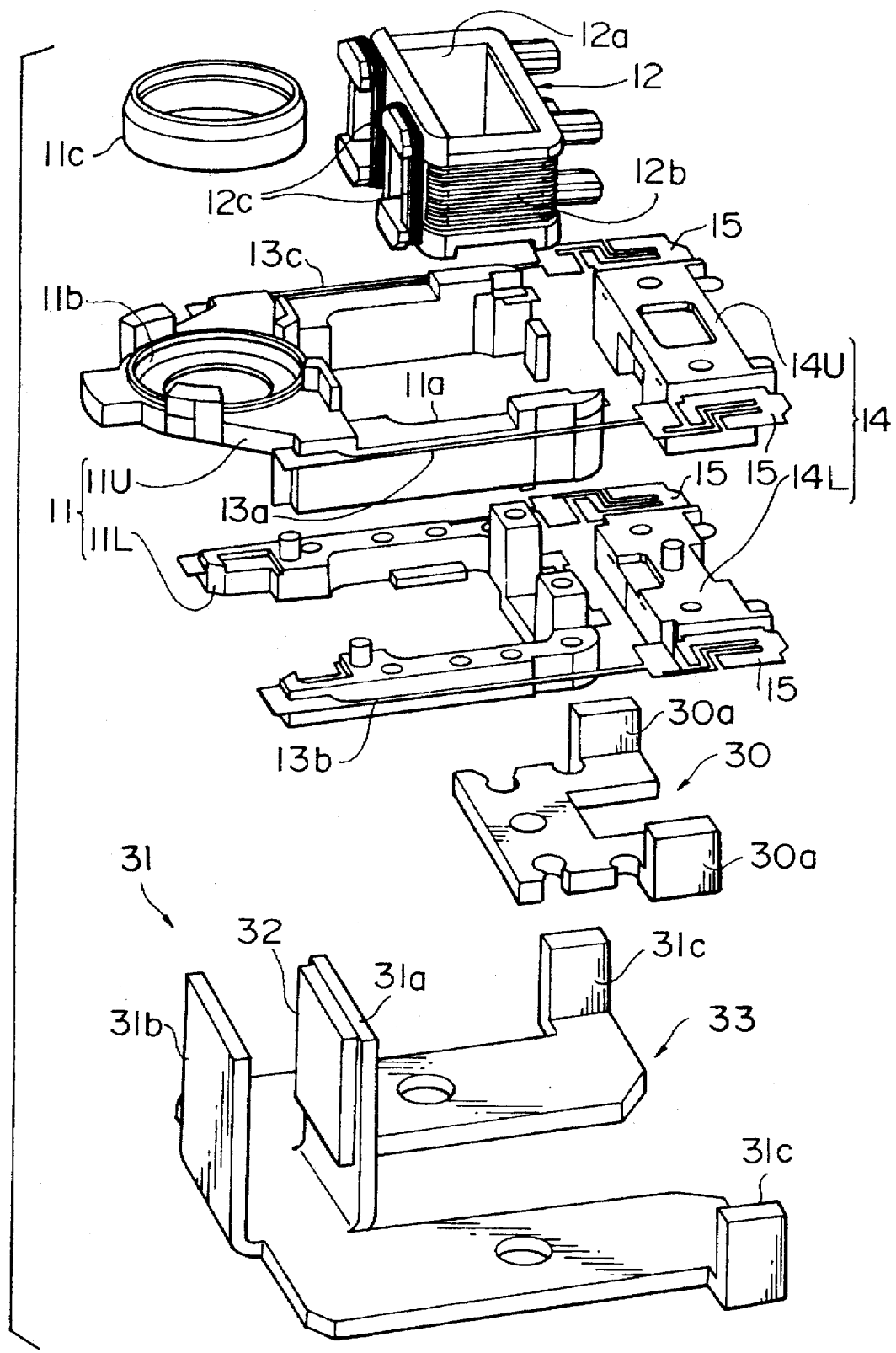
FIG. 3 is a schematic cross sectional view of a critical portion of the bi-axial actuator of FIG. 1.

FIGS. 1 to 3 illustrate a bi-axial actuator of an embodiment in accordance with the present invention. Referring to FIGS. 1 to 3, a bi-axial actuator 10 includes a lens holder 11, a coil bobbin 12, a plurality of elastic supporting members 13a, 13b, 13c, and 13d, a fixing section 14, and a yoke 31.

As illustrated in FIG. 3, the aforementioned lens holder 11 is divided into an upper section 11U and a lower section 11L by a horizontal dividing line, the sections being bonded together. The lens holder 11, as shown in FIG. 3, has an opening 11a used for fixing the coil bobbin as well as a recess 11b used for fixing the objective lens.

A hole is formed in the bottom of the recess 11b, and is used for passing a light beam emitted from the semiconductor laser or a returning light beam from an optical disc recording surface. An objective lens 11c is mounted to the recess 11b of the lens holder by a bond or the like.

Further the lens holder is supported by the elastic supporting members 13a, 13b, 13c, and 13d in such a manner as to allow it to move along the focusing dimension Fcs, (which is parallel to the optical axis of the objective lens 11c); and the tracking dimension Trk, (which is perpendicular to the optical axis of the objective lens 11c).

The coil bobbin, 12 has formed therein an opening 12a, and is used for inserting a magnetic circuit including the yoke 31 formed integrally with a base 33 and a permanent magnet 32, the magnet being attached to the inner side of an inner yoke member 31a. It also has wound thereon focusing coils 12b and tracking coils 12c.

The focusing coils 12b are wound on the coil bobbin 12 along an axis parallel to the optical axis of the objective lens 11c. On the other hand, the tracking coils 12c are elliptical-shaped or rectangular-shaped coils. The coil bobbin 12, with the focusing coils 12b and the tracking coils 12c wound thereon, is fitted into the opening 11a formed in the lens holder 11.

Materials such as phosphor bronze, beryllium copper, titanium copper, tin-nickel alloy, stainless steel, etc., are used to make the elastic supporting members 13a, 13b, 13c, and 13d because it is preferable that they are conductive and resilient. In the embodiment, these are formed, for example, as sheet metal suspensions by thin leaf springs. These suspensions are fixed between the lens holder 11 and the fixing section 14 in such a manner as to be parallel therewith.

Accordingly, the elastic supporting members 13a, 13b, 13c, and 13d may be constructed such that the driving current from an external current supply means (not shown) is supplied to the focusing coils 12b and the tracking coils 12c.

Viscous members 16, or dampers, are applied to the end areas 15 of the elastic supporting members 13a, 13b, 13c, and 13d, and hardened.

With the lens holder 11 and the fixing section 14 linked to the four elastic supporting members 13a, 13b, 13c, and 13d, the fixing section 14 is mounted onto an adjusting plate 30. The adjusting plate 30 is used for adjusting the fixing position of the fixing section 14 during assembly of the bi-axial actuator 10, and is fixed onto the base 33 formed integrally with the yoke 31 by soldering or the like.

Mounting of the adjusting plate 30 onto the base 33 is performed by soldering rise sections 30a with respect rise sections 31c. The rise sections 30a extend upward from both sides of around the back end of the adjusting plate 30. The rise sections 31c extend upward from both sides of the back end of the base 33.

The base 33 has the pair of yoke members 31a and 31b forming the above-described magnetic circuit, which bend upward from the edges of the base 33 at the objective lens side, and the permanent magnet 32 mounted to the inner side of the inner yoke member 31a which is opposite the facing yoke member 31b. Accordingly, the magnetic circuit is formed by the pair of yoke members 31a and 31b, and the permanent magnet 32.

As illustrated above, when the fixing section 14 is mounted onto the base 33, the focusing coils 12b and the tracking coils 12c wound on the coil bobbin 12 are inserted into the gap between the facing yoke member 31b and the permanent magnet 32. At the same time, the inner yoke member 31a and the permanent magnet 32 are inserted into the opening 12a in the coil bobbin 12.

Figure 4:
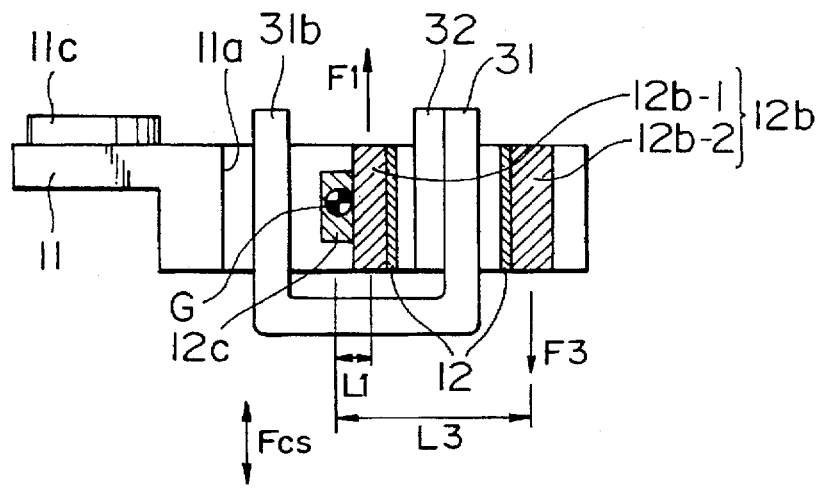
FIG. 4 is a schematic plan view of the bi-axial actuator of FIG. 1.

The coil bobbin 12 of the bi-axial actuator 10 may be constructed as illustrated in FIG. 4.

The coil bobbin 12 includes focusing coils 12b wound thereon such that they surround the opening 12a. The focusing coils 12b have an effective section 12b-1, which exists between the yoke members 31a and 31b, and a noneffective section 12b-2, which exists opposite the effective section 12b-1. Passing current through the focusing coils 12b causes drive current to flow through the aforementioned effective section 12b-1 and noneffective section 12b-2 of the focusing coil 12b. The current which flows through the effective section 12b-1 of the focusing coils 12b, disposed between the inner yoke member 31a and the facing yoke member 31b, reacts with the magnetic flux due to the yoke members 31a, 31b, and the permanent magnet 32 so as to generate, in accordance with Fleming's left-hand rule, a thrust F1 which moves the lens holder 11 along the focusing dimension Fcs.

Unlike conventional yokes, in this case, the upper ends of the inner yoke member 31a and the facing yoke member 31b are not linked by a yoke bridge, but are open. This means that leakage magnetic flux from the yoke members 31a, 31b, and the permanent magnet 32 flows through the noneffective section 12b-2 of the focusing coils 12b, opposite the effective section 12b-1. When this occurs, the current flowing through the noneffective section 12b-2 of the focusing coils 12b, opposite the effective section 12b-1, reacts with the leakage magnetic flux due to the yoke 31a, 31b, and the permanent magnet 32, so as to generate, in accordance with Fleming's left-hand rule, an opposing thrust F3 which moves the lens holder 3 along the focusing dimension Fcs.

The moving section assembly, including the coil bobbin 12 having wound thereon the focusing coils 12b and the tracking coils 12c, the objective lens 11c, and the lens holder 11, has its center of gravity G positioned forwardly of the front focusing coils 12b-1 and the tracking coils 12c, as illustrated in FIG. 4. Here, the position of the center of gravity is selected such that when the distances from the centers of gravity G to the effective section 12b-1 and the noneffective section 12b-2 of the focusing coils 12b toward the back side of the bi-axial actuator are represented by L1 and L3, respectively, the following Equation 1 is satisfied:

$$F1 \times L1 = F3 \times L3 \qquad (1)$$

Figure 5:
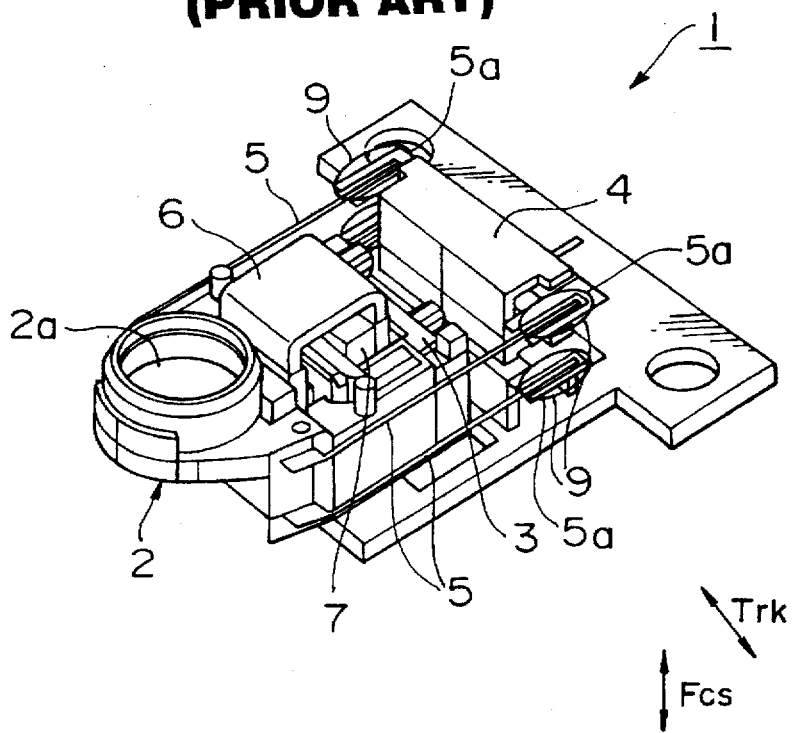
FIG. 5 is a schematic perspective view of an overall construction of a conventional optical pickup bi-axial actuator.
Figure 6:
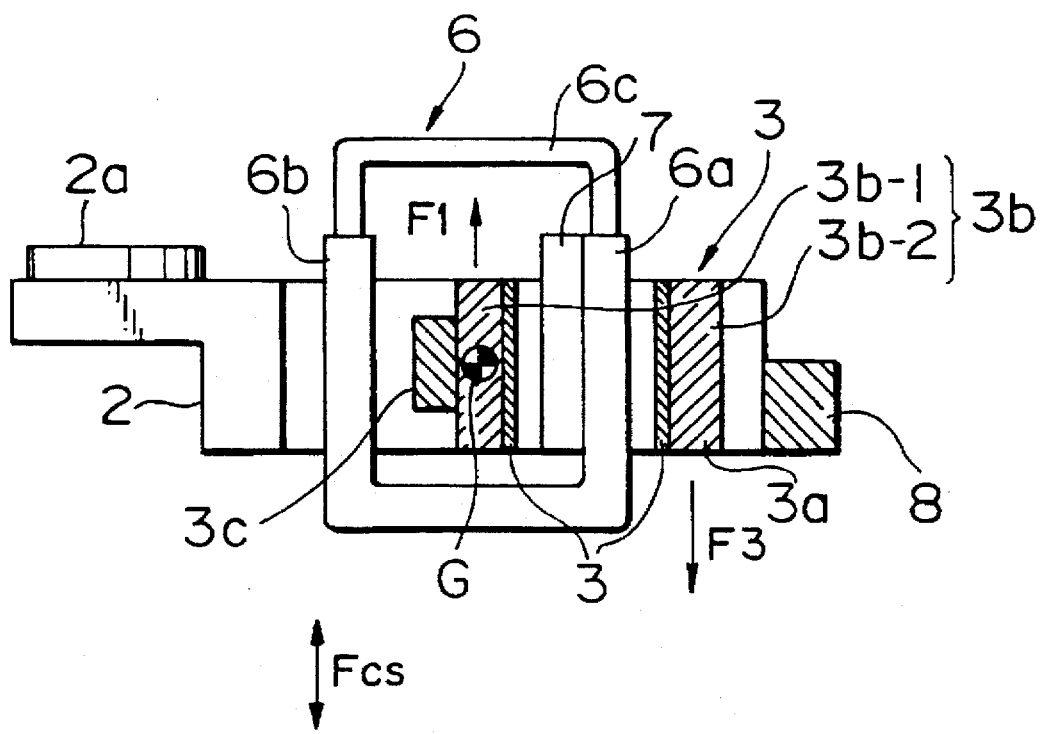
FIG. 6 is a schematic cross sectional view of a critical portion of the bi-axial actuator of FIG. 5.

In the bi-axial actuator 1 such as that illustrated in FIG. 5, the center of gravity G of the moving section assembly is positioned between the effective section 3b-1 of the focusing coil 3b and the tracking coil 3c, whereas in the bi-axial actuator 10 of the embodiment, the center of gravity G is shifted toward the front. The difference in the center of gravity position occurs because the balance weight 8, mounted to the rearmost end of the conventional moving section assembly or the lens holder 2, is not employed in the bi-axial actuator of the embodiment.

The bi-axial actuator 10 of the embodiment is constructed in the above-described way, wherein current is supplied to each of the focusing coils 12b and the tracking coils 12c, both of which are wound on the coil bobbin 12, in accordance with the focus servo signal and the tracking servo signal, respectively.

This causes the direct current magnetic field of the magnetic circuit and the alternating magnetic field developed from the focusing coils 12b and the tracking coils 12c to drive the lens holder 11, that is the objective lens 11c, along the focus dimension Fcs and the tracking dimension Trk.

The viscous members 16, or dampers, are applied onto the end areas 15 of the elastic supporting members 13a, 13b, 13c, and 13d, the end areas being adjacent to the fixing section 14, and are hardened, so that the desired damping characteristics can be obtained. The dampers dampen the vibrations of the elastic supporting members 13a, 13b, 13c, and 13d, during focusing or tracking.

Here, as shown in FIG. 4, the center of gravity G of the moving section assembly is positioned forwardly of the tracking coils 12c, so that the Equation 1 is satisfied, as stated above. Accordingly, when the opposing thrust F3 due to the leakage magnetic flux that is developed in the noneffective section 12b-2, opposite the effective section of the focusing coils 12b, is utilized to balance it with the thrust F1 developed at the effective section 12b-1 with respect to the center of gravity, the opposing thrust F3 suppresses resonance mode resulting from the thrust F1, during focusing, at the elastic supporting members 13a, 13b, 13c, and 13d.

In this way, the resonance mode of the elastic supporting members 13a, 13b, 13c, and 13d, during focusing, is suppressed by the opposing thrust F3 at the noneffective section 12b-2 of the focusing coils 12b, opposite the effective section 12b-1. Here, the opposing thrust F3 at the noneffective section 12b-2, opposite the effective section of the focusing coils 12b, is used, thereby making it unnecessary to block the magnetic flux that passes through the noneffective section 12b-2. This in turn makes it unnecessary to use a yoke bridge which links the upper ends of the yoke members 31a and 31b to form a closed magnetic circuit.

In this way, in the focusing coil of the embodiment, a thrust and an opposing thrust along the focusing dimension are produced, respectively, at the effective section between the yoke members and the noneffective section which is opposite the effective section. Resonance mode of the elastic supporting members caused by movement of the moving section assembly during focusing is suppressed by the opposing thrust produced at the noneffective section, opposite the effective section of the focusing coil. Therefore, to reduce the opposing thrust at the noneffective section, opposite the effective section of the focusing coil, it is no longer necessary to block the passage of the leakage magnetic flux to the noneffective section.

The moving section assembly can be made lighter in weight when the balance weight is not mounted to the rearmost end of the lens holder in order to position the center of gravity forwardly of the tracking coil. Therefore, fewer parts need to be used, the parts cost and the assembly cost are reduced, and, in addition, the responsiveness of the moving section assembly, during focusing and tracking, is improved because of its lighter weight.

To increase the opposing thrust produced at the noneffective section, opposite the effective section of the focusing coil, it is not necessary to use a yoke bridge to link the open upper ends of the inner yoke member and the facing yoke member, which results in the use of fewer parts, and reduced parts cost and assembly cost.

It is obvious that the elastic supporting members 13a, 13b, 13c, and 13d in the aforementioned embodiment can be inserted into the lens holder 11 and the fixing section 14 to form an integral structure therewith, although in the foregoing description the elastic supporting members were merely fixed with respect to the lens holder and the fixing section 14. It is also obvious that the lens holder 11 can be integrally formed, although in the foregoing description it was divided into the upper section 11U and the lower section 11L.

What is claimed is:

1. A lens moving apparatus comprising:
   a lens holder holding an objective lens at one end of said lens holder;
   a coil bobbin mounted to said lens holder;
   a moving assembly formed by said lens holder and said coil bobbin;
   focusing coils wound on said coil bobbin;
   tracking coils wound on said coil bobbin;
   elastic supporting means resiliently supporting said moving assembly with respect to a fixing section wherein the coil bobbin is positioned between the objective lens and the fixing section;
   a yoke comprised of an inner yoke member and a facing yoke member fixed and disposed, respectively, at an inner side and an outer side of the coil bobbin with respect to said fixing section, said facing yoke member being interposed between the objective lens and the coil bobbin;
   a magnet mounted to the inner side of at least either of said inner yoke member or said facing yoke member;
   an effective section of said focusing coil disposed between said inner yoke member and said facing yoke member; and
   a noneffective section of said focusing coil disposed on a side of said yoke opposite said effective section;
   wherein a center of gravity of said moving assembly is positioned at an objective lens side of said coil bobbin so that a first product of a first distance with a first force is about equal to a second product of a second distance with a second force, the first force produced at said effective section of said focusing coil, the first distance measured from the center of gravity of said moving assembly to said effective section of said focusing coil, the second force produced at said noneffective section of said focusing coil, and the second distance measured from the center of gravity of said moving assembly to said noneffective section.

2. A lens moving apparatus according to claim 1, wherein said coil bobbin has formed therein an opening used for inserting said inner yoke member, has wound thereon said focusing coils along a surface parallel to an optical axis of said objective lens, and also has wound thereon said tracking coils in a rectangular shape at a side near said objective lens of said coil bobbin such that said tracking coils are positioned over said focusing coils.

3. A lens moving apparatus according to claim 1, wherein said elastic supporting means has one end mounted to said moving assembly and the other end supported with respect to said fixing section such that said moving assembly is displaceably supported with respect to said fixing section along an optical axis of said objective lens and a direction perpendicular to said optical axis.

4. A lens moving apparatus according to claim 3, wherein said elastic supporting means is formed by a plurality of elastic and resilient supporting members.

5. A lens moving apparatus according to claim 3, wherein said objective lens is disposed on one side of said moving assembly, said elastic supporting means is disposed on an opposite side of said moving assembly, and said coil bobbin is disposed between said objective lens and said elastic supporting means.

6. A lens moving apparatus according to claim 1, wherein said inner yoke member and said facing yoke member of said yoke have free ends opposite ends fixed to the fixing section, the free ends are not lined to each other but are open to form a magnetic circuit along with said magnet so as to generate forces in said effective section which are opposite in direction to forces generated in said noneffective section of said focusing coil.

7. A lens moving apparatus comprising:

a moving assembly formed by a lens holder holding an objective lens at one end of said moving assembly and a coil bobbin mounted to said lens holder;

focusing coils wound on said coil bobbin;

tracking coils wound on said coil bobbin;

elastic supporting means having one end mounted to said moving assembly and an opposite end supported with respect to a fixing section such that said moving assembly is displaceably supported with respect to said fixing section along an optical axis of said objective lens and along a direction perpendicular to said optical axis and wherein the coil bobbin is positioned between the objective lens and the fixing section;

a yoke comprised of an inner yoke member and a facing yoke member fixed and disposed, respectively, at an inner side and an outer side of said coil bobbin with respect to said fixing section, said facing yoke member being interposed between the objective lens and the coil bobbin;

a magnet mounted to an inner side of at least either of said inner yoke member or said facing yoke member;

an effective section of said focusing coil disposed between said inner yoke member and said facing yoke member;

a noneffective section of said focusing coil disposed on a side of said yoke opposite said effective section;

wherein said coil bobbin is positioned on said moving assembly so that when a first distance from said effective section of said focusing coil to a center of gravity of said moving assembly is represented by L, a second distance from said noneffective section of said focusing coil to the center of gravity of said moving assembly is represented by L', a first driving force produced at said effective section is defined as F, and a second driving force produced at said noneffective section is defined as F', the first and second distances are sized such that:

$$L*F=L'*F'.$$

8. A lens moving apparatus according to claim 7, wherein said coil bobbin has formed therein an opening used for inserting said inner yoke, has wound thereon said focusing coils along a surface parallel to the optical axis of said objective lens, and also has wound thereon said tracking coils in a rectangular shape at a side near said objective lens of said coil bobbin such that said tracking coils are positioned over said focusing coils.

9. A lens moving apparatus according to claim 7, wherein said inner yoke member of said yoke is inserted into said opening formed in said bobbin, and wherein said facing yoke member is disposed outside said coil bobbin and between said objective lens and coil bobbin.

10. A lens moving apparatus according to claim 7, wherein said objective lens is disposed on one side of said moving assembly, said elastic supporting means is disposed on the other side of said moving assembly, and said coil bobbin is disposed between said objective lens and said elastic supporting means.

11. A lens moving apparatus according to claim 7, wherein said inner yoke member and said facing yoke member of said yoke have free ends opposite ends fixed to the fixing section, the free ends are not linked to each other but are open to form a magnetic circuit along with said magnet so as to generate forces in said effective section which are opposite in direction to forces generated in said noneffective section of said focusing coil.

* * * * *